United States Patent [19]

Kühne et al.

[11] 4,231,964

[45] Nov. 4, 1980

[54] NITROAMINES, PROCESSES FOR THEIR MANUFACTURE AND THEIR USE AS DIAZO COMPONENTS

[75] Inventors: Rudolf Kühne, Frankfurt am Main; Heinrich Hamal, Liederbach, both of Fed. Rep. of Germany

[73] Assignee: Hoechst Aktiengesellschaft, Frankfurt am Main, Fed. Rep. of Germany

[21] Appl. No.: 4,608

[22] Filed: Jan. 18, 1979

Related U.S. Application Data

[63] Continuation of Ser. No. 862,666, Dec. 21, 1977, abandoned.

[30] Foreign Application Priority Data

Dec. 23, 1976 [DE] Fed. Rep. of Germany ....... 2658329

[51] Int. Cl.³ ............................................. C07C 93/06
[52] U.S. Cl. .................................................. 564/305
[58] Field of Search ........................................ 260/571

[56] References Cited

PUBLICATIONS

Ashley et al., "J. Chem. Soc.", pp. 3298-3313 (1958).

*Primary Examiner*—John Doll
*Attorney, Agent, or Firm*—Curtis, Morris & Safford

[57] ABSTRACT

Compounds of the formula

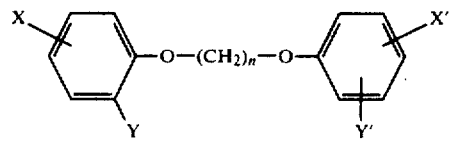

wherein one of the pairs of substituents X and X' on the one hand and Y and Y' on the other hand stands for nitro and the other for amino and wherein n is 1 to 4, are diazo components, especially for disazo pigments of high tinctorial strength and purity of shade.

5 Claims, No Drawings

NITROAMINES, PROCESSES FOR THEIR MANUFACTURE AND THEIR USE AS DIAZO COMPONENTS

This is a continuation of application Ser. No. 862,666, filed Dec. 21, 1977, now abandoned.

The present invention relates to new nitroamines from the diphenoxy-alkane series, of the general formula (1)

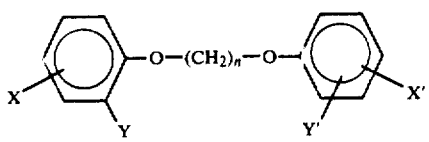

in which one of the substituent pairs X and X' on the one hand and Y and Y' on the other hand denotes nitro groups and the other denotes amino groups and n denotes 1 to 4.

The invention furthermore relates to processes for the manufacture of the compounds of the formula (1), in which compounds of the formulae (2) and (3)

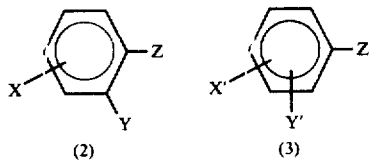

are subjected to a condensation reaction, optionally stepwise, with compounds of the formula (4)

in which one of the substituent pairs X and X' or Y and Y' denotes optionally protected amino groups and the other denotes nitro groups, Z and Z' denote substituents which can react with one another with the formation of an ether bridge and n denotes 1 to 4, or compounds of the formula (5)

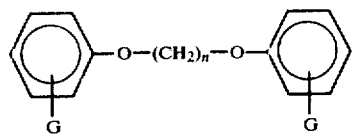

in which n has the meaning given and G represents an optionally protected amino group, are nitrated and, if appropriate, the protected amino group is converted into the free amino group.

The invention furthermore relates to the use of compounds of the formula (1) as diazo components for the manufacture of colorants, in particular of disazo pigments.

Preferred compounds of the formula (1) correspond to the formulae (6), (7) and (8)

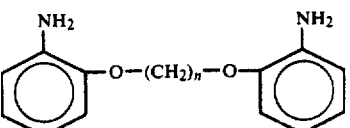

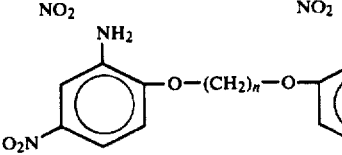

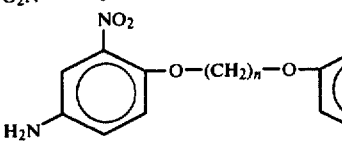

in which n denotes an integer from 1-4.

The condensation of the compounds (2) and (3) with the bifunctional compounds (4) is carried out in a manner which is in itself known, for example by condensation of the phenols or of the corresponding alkali metal phenolates with dihalogenoalkanes, or of the halogenoaromatic compounds with the corresponding glycols. It is also possible to use bifunctional compounds of the formula (4) with different reactive groups Z', especially if the reaction is to be carried out stepwise, for example in the synthesis of unsymmetric compounds by condensation with different compounds of the formulae (2) and (3).

Protected amino groups are to be understood, in particular, as acylamino groups, lower alkanoylamino groups being preferred. The protective groups are split off in a manner which is in itself known, for example by deacylation by means of alkaline or acid saponification.

The nitroamines according to the invention are preferably manufactured by reacting the corresponding nitro-acetaminophenols of the general formula (9)

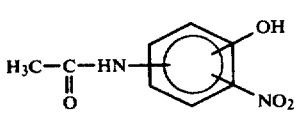

with dihalogenoalkanes of the general formula (10)

in which Hal denotes a chlorine, bromine or iodine atom and n denotes an integer from 1–4, in a polar solvent at elevated temperatures of up to 200° C., preferably 50° to 150° C., in the presence of a suitable proton acceptor, for example an alkali metal hydroxide, isolating the bis-acetamino compound formed and then splitting off the two acetyl groups. Suitable polar solvents are, for example, lower alkanols or alkanediols, acetone, dimethylformamide or dimethylsulfoxide or mixtures thereof.

It is also possible to use the corresponding alkali metal phenolates and then to carry out the reaction without the proton acceptor mentioned.

A suitable manufacturing process consists, for example, in reacting 2 moles of the appropriately substituted nitroacetaminophenol with a little more than 1 mole of dibromoalkane in the presence of a little less than 2 moles of alkali metal hydroxide in an aqueous-alcoholic medium at temperatures between 100° and 150° C. in a pressure vessel, during which it can be appropriate to catalyze the reaction by adding a small amount of an alkali metal iodide. The sparingly soluble bisacetamino compounds can be easily separated off from the reaction mixture by filtration and can be obtained free from undesired by-products by washing with ethanol and water and subsequent extraction by stirring with dilute aqueous alkali metal hydroxide. In some cases the acetyl group can be particularly easily split off, so that a mixture of the bisacetamino compound and a small amount of the corresponding diamine is already obtained during the reaction. The acetyl radicals can be split off under acid or alkaline conditions, for example by heating for a short time in sulfuric acid and subsequent dilution with water, some of the diamines precipitating directly by hydrolysis of their sulfates and others being separated out by rendering the acid solution alkaline. Alkaline saponification can be effected by boiling the bisacetamino compounds in, for example, ethanol with concentrated aqueous alkali metal hydroxide, whereupon the diamine crystallizes out directly or can be precipitated by distilling off some of the solvent or by adding water.

The nitroamines according to the invention can also be manufactured by other methods, for example by nitrating suitably substituted diphenoxy-alkanes and, if appropriate, separating the isomers. In some cases it can also be advantageous, in the reaction of the nitro-acetaminophenols with a dihalogenoalkane, to first manufacture a ω-halogenoalkoxy-nitro-acetanilide by choosing mild condensation conditions, and then to subject this product to a condensation reaction with a further mole of the same nitro-acetaminophenol or of another nitro-acetaminophenol under the same or altered reaction conditions to give the bis(phenoxy)-alkane. The diphenoxy-alkane chain can also be built up, for example, by condensation of a suitable halogeno-nitrobenzene with an alkanediol. Finally, it is also possible to first react a suitable halogeno-nitrobenzene with an alkanediol to give a ω-hydroxy-ether, to convert this by halogenation, for example chlorination with thionyl chloride, into a ω-halogenoalkoxy derivative and then to subject this to a condensation reaction with a suitable phenolic compound, the intermediate stage of the ω-hydroxy-ether also being accessible, for example, by condensation of a suitable substituted phenolic compound with a ω-halogeno-alkanol.

The nitroamines are in general obtained in such high purity that they can be used for industrial purposes without further purification operations. If an additional purification is desired for particular purposes, it can be effected, for example, by dissolving and reprecipitating, optionally with the addition of a clarifying agent, for example active charcoal, from a suitable solvent or solvent mixture, for example from hot dimethylformamide with the subsequent addition of methanol. Purification via a salt of a strong mineral acid, for example sulfuric acid, and subsequent hydrolysis or alkalization can also be appropriate.

The nitroamines according to the invention are yellow to brown crystalline solids with definite melting points. They can be diazotized by customary methods, for example by adding an aqueous alkali metal nitrite solution to a cooled solution or suspension of the nitroamine, or of its salt, in a mineral acid or by adding nitrosylsulfuric acid to a solution or suspension of the nitroamine, or its salt, in a suitable solvent.

If the resulting bis-diazonium salts are coupled by customary methods with suitable coupling components, for example amines, phenols, naphthols, derivatives of β-hydroxynaphthoic acid or enolizable ketomethylene compounds which are capable of coupling, valuable disazo colorants are obtained. In particular, when the bis-diazonium salts are coupled with acetoacetic acid arylamides and 1-aryl-pyrazol-5-ones, valuable yellow to orange-colored sparingly soluble disazo pigments of high tinctorial strength and high purity of color are obtained. The disazo pigments obtainable from the nitroamines according to the invention are outstandingly suitable for pigmenting high-molecular organic material, for dyeing or printing plastics, natural and synthetic resins, rubber, paper, viscose, cellulose, cellulose esters, cellulose ethers, polyvinyl chloride, polyamides, polyolefines, polystyrene, polyurethanes, polyacrylonitrile or polyglycol terephthalates, and for the manufacture of printing inks, gloss paints and emulsion paints and for pigmenting printing pastes for graphic and textile printing.

In the examples which follow, the melting points are uncorrected and have been determined using a Tottoli melting point determination apparatus.

The IR spectra were recorded using a PERKIN ELMER MODEL 700 IR spectrometer. The $^1$H-NMR spectra were obtained using a VARIAN A-60 nuclear magnetic resonance spectrometer.

The percentage data relate to the weight, unless otherwise indicated.

EXAMPLE 1

Bis-(5-nitro-2-amino-phenoxy)-methane

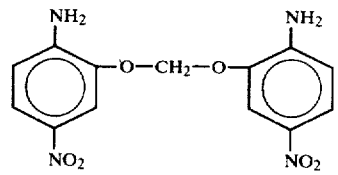

39.2 g of 5-nitro-2-acetaminophenol are stirred in 150 ml of ethanol and, after adding 19.1 g of methylene bromide and a solution of 10.1 g of potassium hydroxide and 0.1 g of potassium iodide in 12 ml of water, the mixture is heated in a stirred autoclave in the course of 6 hours, the temperature rising uniformly to 110° C. The mixture is then stirred for 10 hours at 110°-115° C. After cooling, the mixture is filtered and the residue is washed first with ethanol and then with water. The residue is then extracted by stirring twice with 300 ml of 2% strength sodium hydroxide solution each time, washed until neutral and dried in vacuo at about 70° C. A brownish crystalline composition is obtained which melts at 220°-225° C., with partial decomposition, and consists predominantly of bis-(5-nitro-2-acetaminophenoxy)-methane, in addition to a small amount of bis-(5-nitro-2-amino-phenoxy)-methane.

In order to split off the acetyl groups, 10 g of the resulting crude bis-acetyl compound are heated to the boil in 400 ml of ethanol, whilst stirring, and, after adding 20 ml of 33% strength sodium hydroxide solution, the mixture is boiled under reflux cooling for 30 minutes. After cooling, the mixture is filtered and the residue is washed first with ethanol and then with a large amount of water. After drying the residue in vacuo at about 70° C., the diamine is obtained in the form of small yellow needles which melt at 203°-205° C., with partial decomposition. Analytically pure bis-(5-nitro-2-amino-phenoxy)-methane is obtained in the form of small yellow felted needles after recrystallization from ethanol or in the form of yellow prisms after recrystallization from ethyl acetate, and these melt at 204°-205° C., with partial decomposition.

Analysis: $C_{found}$ 48.8%, $C_{calculated}$ 48.75%; $H_{found}$ 3.8%, $H_{calculated}$ 3.78%; $N_{found}$ 17.6%, $N_{calculated}$ 17.50%.

The resulting diamine is suitable for the manufacture of a yellow disazo pigment. For this, 3.2 g of the resulting diamine is stirred with 20 ml of 5 N hydrochloric acid for several hours and, after adding 20 g of ice, the mixture is diazotized with 4.1 ml of 5 N sodium nitrite solution in the customary manner. After clarifying with kieselguhr and removing excess nitrite with amidosulfonic acid, the resulting bis-diazonium salt solution is coupled with a fine-particled aqueous suspension of 3.72 g of acetoacetanilide in the presence of an acetate buffer, a sparingly soluble greenish-tinged yellow disazo pigment of very high tinctorial strength being formed. After filtering, drying and grinding, a pigment powder is obtained which is outstandingly suitable for coloring, for example, printing inks.

EXAMPLE 2

1,2-Bis-(5-nitro2-amino-phenoxy)-ethane 39.2 g of 5-nitro-2-acetaminophenol are stirred in 150 ml of ethanol and, after adding 20.7 g of 1,2-dibromoethane and a solution of 10.1 g of potassium hydroxide and 0.1 g of potassium iodide in 12 ml of water, the mixture is reacted in a stirred autoclave and worked up as described in Example 1. A greenish-yellow crystalline powder is obtained which melts at 295°-300° C., with partial decomposition, and consists predominantly of 1,2-bis-(5-nitro-2-acetamino-phenoxy)-ethane and of a small amount of 1,2-bis-(5-nitro-2-amino-phenoxy)-ethane.

In order to split off the acetyl groups, 10 g of the resulting bis-acetyl compound are introduced into 200 ml of 60% strength sulfuric acid, having a temperature of 115°-120° C., whilst stirring, and the mixture is stirred for 20 minutes at this temperature. After cooling to about 50° C., the resulting solution is poured onto 2,000 ml of water and stirred for a further 30 minutes at room temperature, whereupon the diamine separates out as a yellow precipitate. It is filtered off, washed with water until neutral and dried in vacuo at about 70° C. The diamine is obtained in the form of a greenish-yellow powder which melts at 290°-293° C., with partial decomposition. Analytically pure 1,2-bis-(5-nitro-2-amino-phenoxy)-ethane is obtained after recrystallization from dimethylformamide. Small greenish-yellow microcrystalline needles are formed which melt at 293°-295° C., with partial decomposition.

Analysis: $C_{found}$ 50.4%, $C_{calculated}$ 50.30%; $H_{found}$ 4.3%, $H_{calculated}$ 4.22%; $N_{found}$ 16.8%, $N_{calculated}$ 16.76%.

EXAMPLE 3

1,3-Bis-(5-nitro-2-amino-phenoxy)-propane 39.2 g of 5-nitro-2-acetaminophenol, 150 ml of ethanol, 22.2 g of 1,3-dibromopropane and a solution of 10.1 g of potassium hydroxide and 0.1 g of potassium iodide in 12 ml of water are reacted in a stirred autoclave, and the mixture is worked up, as described in Example 1. The resulting greenish-yellow reaction product is a mixture of 1,3-bis-(5-nitro-2-acetamino-phenoxy)-propane and 1,3-bis-(5-nitro-2-amino-phenoxy)-propane.

In order to split off the acetyl groups completely, 10 g of the resulting reaction product are saponified in 200 ml of 60% strength sulfuric acid and the mixture is worked up as described in Example 2. The diamine is obtained in the form of a yellow crystalline powder which melts at 187°-189° C., with partial decomposition. Analytically pure 1,3-bis-(5-nitro-2-amino-phenoxy)-propane is obtained, by recrystallization from a large amount of ethanol, in the form of small yellow needles which melt at 189°-190° C., with partial decomposition.

Analysis: $C_{found}$ 51.7%, $C_{calculated}$ 51.72%; $H_{found}$ 4.6%, $H_{calculated}$ 4.63%; $N_{found}$ 16.1%, $N_{calculated}$ 16.09%.

EXAMPLE 4

1,4-Bis-(5-nitro-2-amino-phenoxy)-butane 39.2 g of 5-nitro-2-acetaminophenol are reacted as described in Example 1, but with the alteration that 23.8 g of 1,4-dibromobutane are used instead of methylene bromide. After the working up described in Example 1, a greenish-yellow reaction product is obtained which is a mixture of 1,4-bis-(5-nitro-2-acetamino-phenoxy)-butane and 1,4-bis-(5-nitro-2-amino-phenoxy)-butane.

In order to split off the acetyl groups completely, 10 g of the resulting reaction product are saponified in 200 ml of 60% strength sulfuric acid and the mixture is worked up as described in Example 2. The diamine is obtained in the form of a yellow powder which melts at 224°-226° C., with partial decomposition. Analytically pure 1,4-bis-(5-nitro-2-amino-phenoxy)-butane is obtained on dissolving the crude product in hot dimethylformamide and subsequently adding methanol. The pure product is an ochre-yellow microcrystalline powder which melts at 226°-228° C., with partial decomposition.

Analysis: $C_{found}$ 53.0%, $C_{calculated}$ 53.03%; $H_{found}$ 5.1%, $H_{calculated}$ 5.01%; $N_{found}$ 15.5%, $N_{calculated}$ 15.46%.

EXAMPLE 5

Bis-(4-nitro-2-amino-phenoxy)-methane

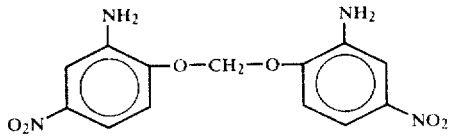

39.2 g of 4-nitro-2-acetaminophenol, 150 ml of ethanol, 19.1 g of methylene bromide and a solution of 10.1 g of potassium hydroxide and 0.1 g of potassium iodide in 12 ml of water are heated in a stirred autoclave in the course of 6 hours, the temperature uniformly rising to 120° C., and the mixture is kept at 120°-125° C. for 10 hours. Working up is carried out as described in Example 1. A brownish crystalline powder is obtained which melts at about 225° C., with partial decomposition, and consists predominantly of bis-(4-nitro-2-acetaminophenoxy)-methane in addition to a small amount of bis-(4-nitro-2-amino-phenoxy)-methane.

In order to split off the acetyl groups, 10 g of the reaction product thus obtained are introduced into 200 ml of 50% strength sulfuric acid at 120° C., whilst stirring, and the mixture is kept at this temperature for 10 minutes. The reaction mixture is poured onto 2,000 g of ice-water, whilst still hot, and then rendered alkaline with concentrated sodium hydroxide solution. The intensively yellow-colored precipitate is filtered off, washed with water until neutral and dried in vacuo at about 70° C. A yellow crystalline powder is obtained which melts at 263°–264° C., with partial decomposition. Bis-(4-nitro-2-amino-phenoxy)-methane is obtained in the analytically pure form if the crude product is dissolved in hot dimethylformamide and reprecipitated by adding methanol. The pure product is in the form of small golden yellow shiny needles which melt at 265°–266° C., with partial decomposition.

EXAMPLE 6

1,2-Bis-(4-nitro-2-amino-phenoxy)-ethane 39.2 g of 4-nitro-2-acetaminophenol are reacted as described in Example 5, 20.7 g of 1,2-dibromoethane being used instead of methylene bromide. After the working up described in Example 1, a brownish reaction product is obtained which consists predominantly of 1,2-bis-(4-nitro-2-acetamino-phenoxy)-ethane and of a small amount of 1,2-bis-(4-nitro-2-amino-phenoxy)-ethane and melts at about 270°–275° C., with partial decomposition.

In order to split off the acetyl groups, 10 g of the reaction product thus obtained are heated to 135°–140° C. for 10 minutes in 200 ml of 70% strength sulfuric acid and the mixture is worked up as described in Example 5. A yellow microcrystalline powder is obtained which melts at 259°–260° C., with partial decomposition. Analytically pure 1,2-bis-(4-nitro-2-amino-phenoxy)-ethane is obtained if the crude product is dissolved in hot dimethylformamide and reprecipitated by adding methanol. The pure product is in the form of small yellow shiny needles which melt at 261°–262° C., with partial decomposition.

EXAMPLE 7

1,3-Bis-(4-nitro-2-amino-phenoxy)-propane 39.2 g of 4-nitro-2-acetaminophenol are reacted as described in Example 5, 22.2 g of 1,3-dibromopropane being used instead of methylene bromide. After the working up described in Example 1, a brownish crystalline powder is obtained which melts at about 250°–255° C., with partial decomposition, and is a mixture of 1,3-bis-(4-nitro-2-acetamino-phenoxy)-propane and 1,3-bis-(4-nitro-2-amino-phenoxy)-propane.

The acetyl groups are split off completely in 70% strength sulfuric acid, as described in Example 6. The resulting diamine is a yellow crystalline powder which melts at 206°–208° C., with partial decomposition. 1,3-Bis-(4-nitro-2-amino-phenoxy)-propane is obtained in the analytically pure form if the crude product is dissolved in hot dimethylformamide and reprecipitated by adding methanol. The pure product is in the form of small yellow felted needles which melt at 209°–210° C., with partial decomposition.

EXAMPLE 8

1,4-Bis-(4-nitro-2-amino-phenoxy)-butane 39.2 g of 4-nitro-2-acetaminophenol are reacted as described in Example 5, 23.8 g of 1,4-dibromobutane being used instead of methylene bromide. After the working up described in Example 1, a brownish reaction product is obtained which melts at about 270° C., with partial decomposition, and consists of 1,4-bis-(4-nitro-2-acetamino-phenoxy)-butane and a little 1,4-bis-(4-nitro-2-amino-phenoxy)-butane.

The acetyl groups are split off completely in 70% strength sulfuric acid, as described in Example 6. The resulting diamine is a yellow crystalline powder which melts at 213°–215° C., with partial decomposition. Analytically pure 1,4-bis-(4-nitro-2-amino-phenoxy)-butane is obtained by dissolving and reprecipitating the crude product from dimethylformamide/methanol. The pure product is in the form of golden yellow shiny flakes which melt at 216°–217° C., with partial decomposition.

EXAMPLE 9

Bis-(2-nitro-4-amino-phenoxy)-methane

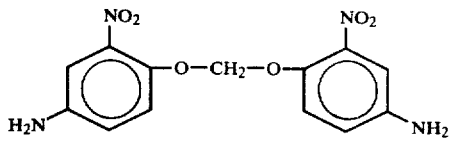

39.2 g of 2-nitro-4-acetaminophenol, 180 ml of ethanol, 19.1 g of methylene bromide and a solution of 10.1 g of potassium hydroxide in 12 ml of water are uniformly heated to 135° C. in a stirred autoclave in the course of 6 hours and the mixture is kept at 135°–140° C. for 10 hours and then at 140°–145° C. for a further 1 hour. Working up is carried out as indicated in Example 1. Small pale brownish-colored, somewhat felted crystal needles are obtained which melt at 252°–256° C., with partial decomposition, and consist predominantly of bis-(2-nitro-4-acetamino-phenoxy)-methane.

In order to split off the acetyl groups, 10 g of the reaction product thus obtained are introduced into a hot mixture of 160 ml of 10 N hydrochloric acid and 40 ml of water and the mixture is heated to the boil and boiled for 10 minutes, the solid dissolving completely. The resulting solution is poured onto 1,000 ml of water, whilst still hot, and rendered alkaline with sodium hydroxide solution. The precipitate which has separated out is filtered off, washed with water until neutral and dried in vacuo at about 70° C. Small yellow needles are obtained which melt at 176°–178° C., with partial decomposition. The bis-(2-nitro-4-amino-phenoxy)-methane thus obtained occurs in two different crystal forms. On recrystallization from a large amount of water or on rendering the salts alkaline, small light yellow needles are obtained which melt at 178° C., with partial decomposition. Recrystallization from ethanol leads to an orange-colored microcrystalline powder (compact prisms) of melting point 181° C. (partial decomposition). The two forms can be converted into one another as desired by changing the solvent.

The $^1$H-NMR spectrum, recorded in dimethylsulfoxide D$_6$ using tetramethylsilane as the internal standard, shows a broad singlet at $\delta = 5.43$ ppm (4H), corresponding to two NH$_2$ groups, a singlet at $\delta = 5.77$ ppm (2H), corresponding to the —O—CH$_2$—O— grouping, and 6 phenyl protons as a multiplet between $\delta = 6.7$ and $7.5$ ppm.

In the IR spectrum, recorded in a potassium bromide tablet, there are three characteristic intense sharp bands, which are attributable to the amino groups, at 3,220 cm$^{-1}$, 3,330 cm$^{-1}$ and 3,400 cm$^{-1}$ in the region of the NH valency vibrations.

EXAMPLE 10

1,2-Bis-(2-nitro-4-amino-phenoxy)-ethane 32.8 g of 1,2-bis-(4-acetamino-phenoxy)-ethane are dissolved in 165 g of sulfuric acid (96% strength) at 10°-15° C. and nitrated at 5°-10° C. with a mixture of 19.5 ml of nitric acid (65% strength) and 20 ml of sulfuric acid (96% strength). The mixture is subsequently stirred at this temperature for 3 hours and at room temperature for 1 hour and then poured onto 900 g of ice-water, whilst stirring. The resulting yellow-brown precipitate is filtered off over an acid-resistant filter, washed with water until neutral and dried in vacuo at about 80° C. The resulting product is a mixture consisting of 1,2-bis-(2-nitro-4-acetamino-phenoxy)-ethane and the isomeric 1,2-bis-(3-nitro-4-acetamino-phenoxy)-ethane. In order to separate the isomers, 10 g of the resulting mixture are introduced into 200 ml of 50% strength sulfuric acid, having a temperature of 120° C., whilst stirring, and the mixture is heated to the boil for 10 minutes. During this procedure, a solution is first formed and then a crystalline solid separates out. After cooling, the mixture is filtered through a glass filter and the residue is washed first with sulfuric acid (50% strength) and thereafter with methanol. After drying, a light grey crystalline powder is obtained which decomposes only above 300° C. and is the sulfate of 1,2-bis-(2-nitro-4-amino-phenoxy)-ethane.

In order to convert the reaction product into the free diamine, 5 g of the resulting sulfate are heated to the boil in a mixture of 50 ml of 5 N hydrochloric acid and 150 ml of water, the mixture is filtered and the filtrate is rendered alkaline with sodium hydroxide solution, whilst still hot. The orange-yellow precipitate is filtered off, washed with water until neutral and dried in vacuo at 70° C. The resulting orange-yellow crystalline powder melts at 175°-177° C., with partial decomposition. Analytically pure 1,2-bis-(2-nitro-4-amino-phenoxy)-ethane is obtained, by recrystallizing the crude product from ethanol, in the form of small orange-red, fine, somewhat felted needles which melt at 177°-178° C., with partial decomposition.

The $^1$H-NMR spectrum, recorded in dimethylsulfoxide $D_6$ using tetramethylsilane as the internal standard, shows a singlet at $\delta = 4.33$ ppm (4H), corresponding to the $-O-CH_2-CH_2-O-$ grouping, a broad singlet at $\delta = 5.33$ ppm (4H), corresponding to the amino groups, and the multiplet (6H) of the phenyl protons between $\delta = 6.7$ and 7.3 ppm.

In the IR spectrum, recorded in a potassium bromide tablet, there are three characteristic intense bands in the region of the NH valency vibrations which are at 3,180 cm$^{-1}$, 3,300 cm$^{-1}$ and 3,400 cm$^{-1}$ and the attributable to the amino groups.

Isomeric 1,2-bis-(3-nitro-4-amino-phenoxy)-ethane can be separated out of the solution, containing sulfuric acid, of the isomer separation as a cinnabar-red precipitate by adding a large amount of water. When dissolved and reprecipitated from dimethylformamide/methanol, a cinnabar-red microcrystalline powder is formed which melts at 242°-243° C., with partial decomposition.

EXAMPLE 11

1,3-Bis-(2-nitro-4-amino-phenoxy)-propane 34.2 g of 1,3-bis-(4-acetamino-phenoxy)-propane are nitrated as described in Example 10, the nitro derivatives are saponified and the nitroamines are separated, via the sulfates, as described. The sulfate of 1,3-bis-(2-nitro-4-amino-phenoxy)-propane is in the form of almost colorless shiny crystal flakes.

In order to convert the reaction product into the free diamine, 5 g of the resulting sulfate are boiled for 10 minutes with a mixture of 80 ml of 10 N hydrochloric acid and 20 ml of water and the mixture is poured into 500 ml of water, whilst still hot, and rendered alkaline with sodium hydroxide solution. The orange-yellow precipitate is filtered off and washed until neutral. After drying at about 70° C., an orange-colored crystalline powder is obtained which melts at 148°-150° C. Analytically pure 1,3-bis-(2-nitro-4-amino-phenoxy)-propane is obtained in the form of small orange-colored prismatic crystals on recrystallization from methanol. The melting point is 152°-153° C.

Analysis: $C_{found}$ 51.6%, $C_{calculated}$ 51.72%; $H_{found}$ 4.6%, $H_{calculated}$ 4.63%; $N_{Found}$ 16.0%, $N_{calculated}$ 16.09%.

The $^1$H-NMR spectrum, recorded in dimethylsulfoxide $D_6$ using tetramethylsilane as the internal standard, shows a multiplet centered at $\delta = 2.15$ ppm (2H), corresponding to the protons of the central $-CH_2-$ group of the $-O-(CH_2)_3-O-$ chain, a triplet centered at $\delta = 4.22$ ppm (4H; J = 6 Hz), corresponding to the two $-O-CH_2-$ groups, a broad singlet at $\delta = 5.25$ ppm (4H), corresponding to the two $NH_2$ groups and the multiplet (6H) of the phenyl protons between $\delta = 6.7$ and 7.3 ppm.

The IR spectrum, recorded in a potassium bromide tablet, shows three characteristic intense absorptions in the region of the NH valency vibrations; they are at 3,220 cm$^{-1}$, 3,350 cm$^1$ and 3,410 cm$^{-1}$ and are attributable to the amino groups.

EXAMPLE 12

1,4-Bis-(2-nitro-4-amino-phenoxy)-butane 39.2 g of 2-nitro-4-acetamino-phenol are dissolved in a mixture of 200 ml of dimethylsulfoxide and 400 ml of acetone and, after adding 23.8 g of 1,4-dibromobutane, 13.8 g of potassium carbonate and 0.1 g of potassium iodide, the solution is boiled under reflux cooling for 10 hours, whilst stirring, and the reaction mixture is discharged onto 5 times the volume of water. The resulting yellow precipitate is filtered off, washed first with 1% strength sodium hydroxide solution and then with water and dried in vacuo at about 60° C. A small amount of 4-(2'-nitro-4'-acetamino-phenoxy)-1-bromobutane, formed by condensation on one side, is removed by boiling up with ethyl acetate. A yellow crystalline powder remains which consists of 1,4-bis-(2-nitro-4-acetamino-phenoxy)-butane and melts at 224°-226° C., with partial decomposition. In order to split off the acetyl groups, 10 g of the resulting diacetyl compound are suspended in 200 ml of ethanol and the suspension is boiled under reflux for 5 hours, whilst passing a stream of hydrogen chloride through. The resulting white suspension is poured onto 2,000 ml of water, the mixture is heated to the boil, a slight residue is filtered off and the filtrate is rendered alkaline with sodium hydroxide solution, whilst still hot. The orange-colored precipitate is filtered off and dried in vacuo at about 70° C. An orange-colored powder is obtained which melts at 192°-194° C., with partial decomposition. Analytically pure 1,4-bis-(2-nitro-4-amino-phenoxy)-butane is obtained in the form of a yellow-red crystalline powder on dissolving and reprecipitating from dimethylformamide/methanol. It melts at 194°–196° C., with partial decomposition.

Analysis: $C_{found}$ 53.1%, $C_{calculated}$ 53.03%; $H_{found}$ 5.1%, $H_{calculated}$ 5.01%; $N_{found}$ 15.5%, $N_{calculated}$ 15.46%.

The IR spectrum, recorded in a potassium bromide tablet, shows, in the region of the NH valency vibrations, intense absorptions at 3,360 cm$^{-1}$ and 3,450 cm$^{-1}$ and a much less intense absorption at 3,220 cm$^{-1}$, which are attributable to the amino groups.

We claim:

1. A compound having the formula

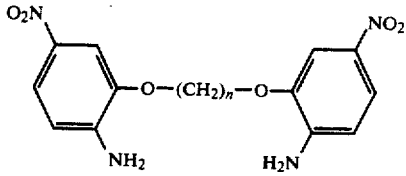

wherein n is 1 to 4.

2. The compound as defined in claim 1, wherein n is 1.

3. The compound as defined in claim 1, wherein n is 2.

4. The compound as defined in claim 1, wherein n is 3.

5. The compound as defined in claim 1, wherein n is 4.

* * * * *